(No Model.)
H. KLEPPE & A. NEUHAUS.
VALVE CLOSING DEVICE.
No. 509,172. Patented Nov. 21, 1893.
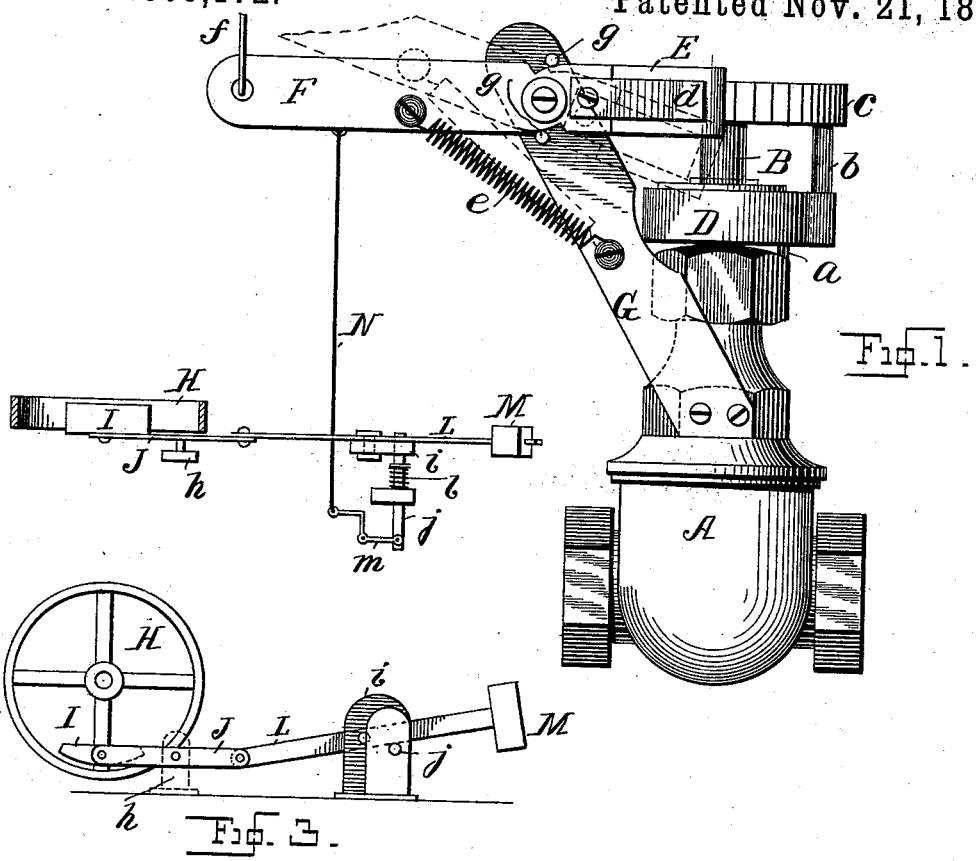
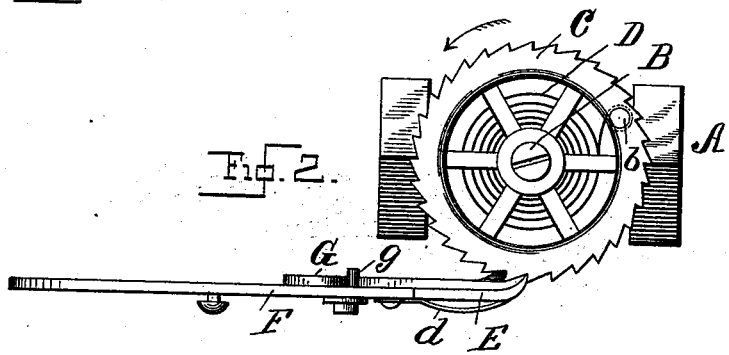
Witnesses
Wm. A. Courtland
M. V. Bidgood
Inventors:
Herman Kleppe and
Alfred Neuhaus
By Twing & Bros
Attys.

UNITED STATES PATENT OFFICE.

HERMAN KLEPPE AND ALFRED NEUHAUS, OF NEW YORK, N. Y.

VALVE-CLOSING DEVICE.

SPECIFICATION forming part of Letters Patent No. 509,172, dated November 21, 1893.

Application filed January 28, 1893. Serial No. 460,031. (No model.)

*To all whom it may concern:*

Be it known that we, HERMAN KLEPPE and ALFRED NEUHAUS, citizens of the United States, residing in the city, county, and State of New York, have invented certain new and useful Improvements in Valve-Closing Devices, of which the following is a specification.

One object of our invention is to provide improved means to permit a valve to be quickly closed by the action of a spring, whereby the necessity of turning the valve by hand to close it is overcome.

A further object of the invention is to permit a brake to be applied to the fly wheel of an engine by the same motion that allows the valve to close whereby as soon as the steam is shut off the momentum of said wheel will be checked.

The invention consists in the novel details of improvement and the combinations of parts that will be more fully hereinafter set forth and then pointed out in the claims.

Referring to the accompanying drawings which form a part of this specification:—Figure I is a side elevation of a valve provided with our improvements showing also the means for applying a brake to a fly wheel in the act of releasing the valve. Fig. II is a plan view of the valve releasing and actuating devices, and Fig. III is a side view of the fly wheel and brake actuating devices.

In the accompanying drawings, the letter A indicates a valve casing (containing any desired valve, not shown) and B is the valve stem, all of suitable construction.

C is a handle or wheel for turning the stem B, said wheel in the drawings being shown as a ratchet or toothed wheel, by which the stem B can be turned by hand to unseat the valve.

D is a spring arranged to turn the stem B to seat the valve. The spring D is shown in the form of a coiled spring, having one end secured, as at $a$ to the casing A, and its other end connected with the wheel C by a rod $b$. But the connection of the spring D with the stem B or wheel C can be suitably arranged. When wheel C is turned in the direction of the arrow in Fig. II, the spring D will be wound and the valve opened, and when the spring unwinds, it will turn stem B to seat the valve.

E is a pawl, carried by a lever F, and adapted to engage the wheel C to hold it in check against the action of spring D and to release the wheel to permit said spring to turn stem B. A spring $d$ carried by lever F holds pawl E in engagement with wheel C. The lever F is carried by a standard G supported by casing A; a spring $e$ connecting the lever F with standard G (or otherwise arranged) to hold pawl E normally in engagement with wheel C.

$f$ is a wire or other connection extending from lever F by which the latter may be operated.

$g, g$ are stops shown carried by standard G on opposite sides of lever F to limit the lateral motion of the latter with relation to the wheel C.

The operation is as follows: In the normal position the pawl E is in engagement with the wheel C. To open the valve, the wheel C is turned in the direction of the arrow in Fig. II, whereupon the spring D is wound, the pawl E and wheel C now holding it under tension. To seat the valve the lever F is moved laterally to carry the pawl E away from wheel C whereupon the spring D will turn wheel C and stem B to seat the valve. The spring $e$ will next return pawl E into engagement with wheel C. This action of closing the valve is very quick, and it is done with such force as to positively seat the valve. In cases where it is desirable to stop the momentum of mechanism or a fly wheel as soon as the stem is shut off, we connect the lever F with a brake for a fly wheel H or other mechanism. In the example shown in the drawings, I is a brake carried by a lever J pivoted on a standard $h$. The lever J is pivoted to another lever L, journaled in a standard $i$, the lever L at its outer end carrying a weight or the like M, adapted to actuate levers L, J to press brake I upon fly wheel H. The weight M is supported to keep brake I from engagement with wheel H when the valve is open, and for this purpose we have shown a rod $j$, adapted to slide in bearings $i$, and to pass under lever L. A spring $l$ is shown to place and hold rod $j$ in this position. The support or rod $j$ is shown connected with lever F by a rod or connection N arranged to withdraw support or rod $j$ from lever L when lever F is turned to permit the valve to close. For convenience of illustration we have shown a bell-crank lever m, connected at one end to rod N and at its other end to rod j. From the foregoing, it will be understood that when the stem B is raised to open the valve, the rod j will extend under lever M to hold weight M and remove brake I from fly wheel H. Now, when lever F is moved to permit spring D to turn stem B to close the valve, the rod N will act to withdraw rod or support j from lever L whereupon the weight M and lever L will descend and lift lever J to press brake I upon wheel H to stop it. These actions are simultaneous so that as soon as the steam is shut off the momentum of wheel H will be checked.

It will be understood that the brake could be applied, conjointly with the shutting off of the steam to any other part of the mechanism except the wheel H, but the arrangement shown will give satisfactory results, the essence of the invention consisting in so connecting the valve mechanism with the brake mechanism that but one intelligent operation is required for both purposes.

It will be seen that the toothed wheel C is the only means by which the stem B can be turned by hand, it being located at one end of the stem, the other end of the stem being concealed in the casing A.

Having thus described our invention, the following is what we claim as new therein and desire to secure by Letters Patent:

1. The combination with a valve stem, of a hand-turning wheel secured on the stem at its outer end, said wheel having teeth on its periphery, a lever and pawl adapted to engage and hold said wheel, and a spring for turning said stem, when released by the pawl, and a connection f extending from said lever, substantially as described.

2. The combination of a casing, a valve stem having one end inclosed in said casing, a toothed wheel carried on the opposite end of said stem and a spring connected with said stem and with said casing for turning said stem with a lever and pawl to hold and release said wheel, said lever and pawl being pivoted so as to have lateral movement with relation to said wheel to release the latter, substantially as described.

3. The combination of a casing and valve stem, with a toothed wheel on said stem, a spring connected at one end to said casing, a pin carried by said wheel and connected to one end of said spring, said spring being located between said wheel and casing, and with a lever and pawl to engage and hold said wheel, substantially as described.

4. The combination of a valve casing, a valve stem and a ratchet wheel carried thereby, with a spring for turning said stem, a lever and pawl to engage said wheel a standard supported on said casing and carrying said lever and stops on said standard on opposite sides of said lever to limit the movement of said lever with relation to said wheel, substantially as described.

5. The combination of a casing, a valve stem, a ratchet wheel carried thereby, a spring connected with said casing and with said wheel and located between said casing and wheel, a lever and pawl, a standard carried by said casing and supporting said lever, stops on said standard to limit the movement of said lever and a spring to hold said lever in its normal position, substantially as described.

HERMAN KLEPPE.
ALFRED NEUHAUS.

Witnesses:
JAS. N. KENNEDY,
MARC M. MICHAEL.